United States Patent
Kim et al.

(10) Patent No.: US 9,049,436 B2
(45) Date of Patent: Jun. 2, 2015

(54) THREE DIMENSIONAL IMAGE DISPLAY DEVICE USING BINOCULAR PARALLAX

(75) Inventors: Duk-Sung Kim, Asan-si (KR); Young Jae Tak, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 287 days.

(21) Appl. No.: 13/458,761

(22) Filed: Apr. 27, 2012

(65) Prior Publication Data

US 2013/0135293 A1    May 30, 2013

(30) Foreign Application Priority Data

Nov. 30, 2011    (KR) .................. 10-2011-0126737

(51) Int. Cl.
| | | |
|---|---|---|
| G02B 27/26 | (2006.01) | |
| H04N 13/04 | (2006.01) | |
| G09G 3/00 | (2006.01) | |
| G09G 3/36 | (2006.01) | |

(52) U.S. Cl.
CPC .......... *H04N 13/0422* (2013.01); *G09G 3/003* (2013.01); *G09G 3/3607* (2013.01); *G09G 3/3614* (2013.01); *G09G 3/3648* (2013.01); *G09G 2300/0426* (2013.01); *G09G 2320/0209* (2013.01); *G09G 2320/028* (2013.01); *G09G 2320/068* (2013.01); *G09G 2330/021* (2013.01); *H04N 13/0434* (2013.01); *H04N 13/0452* (2013.01)

(58) Field of Classification Search
CPC .................................. G02B 27/26; G09G 3/36
USPC .......................................................... 345/419
See application file for complete search history.

(56) References Cited

U.S. PATENT DOCUMENTS

| | | | |
|---|---|---|---|
| 6,335,778 B1 | 1/2002 | Kubota et al. | |
| 7,307,672 B2 | 12/2007 | Feenstra et al. | |
| 7,852,302 B2 * | 12/2010 | Chiang et al. | 345/93 |
| 2008/0252578 A1 | 10/2008 | Kim et al. | |
| 2009/0278777 A1 * | 11/2009 | Wang et al. | 345/89 |
| 2010/0225627 A1 * | 9/2010 | Goh et al. | 345/206 |
| 2010/0265230 A1 | 10/2010 | Kang | |
| 2010/0289884 A1 | 11/2010 | Kang | |
| 2011/0122239 A1 | 5/2011 | Baik et al. | |
| 2011/0216098 A1 * | 9/2011 | Choi et al. | 345/690 |
| 2012/0169688 A1 * | 7/2012 | Chen et al. | 345/209 |

FOREIGN PATENT DOCUMENTS

| | | |
|---|---|---|
| JP | 2004-271617 | 9/2004 |
| JP | 2007-108501 | 4/2007 |

(Continued)

*Primary Examiner* — David Zarka
*Assistant Examiner* — Shivang Patel
(74) *Attorney, Agent, or Firm* — H.C. Park & Associates, PLC

(57) ABSTRACT

A three dimensional image display device includes a liquid crystal display panel assembly which includes a first pixel and a second pixel disposed adjacent to each other in a vertical direction. The first pixel comprises a first subpixel and a second subpixel disposed adjacent to each other in the vertical direction, and the second pixel includes a third subpixel and a fourth subpixel which are disposed adjacent to each other in the vertical direction. The first subpixel and the third subpixel, or the second subpixel and the fourth subpixel display black in a three dimensional (3D) display mode and display a normal image in a two dimensional (2D) display mode.

11 Claims, 7 Drawing Sheets

(56) References Cited

FOREIGN PATENT DOCUMENTS

| | | |
|---|---|---|
| JP | 2007-304236 | 11/2007 |
| JP | 2009-075392 | 4/2009 |
| KR | 10-0303449 | 5/2001 |
| KR | 10-2008-0012566 | 2/2008 |
| KR | 10-0823561 | 4/2008 |
| KR | 10-2010-0128019 | 12/2010 |

* cited by examiner

THREE DIMENSIONAL IMAGE DISPLAY DEVICE USING BINOCULAR PARALLAX

CROSS-REFERENCE TO RELATED APPLICATION

This application claims priority from and the benefit of Korean Patent Application No. 10-2011-0126737, filed on Nov. 30, 2011, which is incorporated herein by reference for all purposes as if fully set forth herein.

BACKGROUND OF THE INVENTION

1. Field of the Invention

Exemplary embodiments of the present invention relate to a three dimensional image display device.

2. Discussion of the Background

A three dimensional (3D) image display technology typically generates a three-dimensional effect of an object using binocular parallax that is the most important factor for recognizing a three-dimensional effect at a short distance. In other words, when different two dimensional (2D) images are reflected in a left eye and a right eye, respectively, and the image reflected in the left eye ("left eye image") and the image reflected in the right eye ("right eye image") are transmitted to a brain, the left eye image and the right eye image are fused in the brain to be recognized as a 3D image having depth perception.

A three-dimensional image display device uses the binocular parallax and is classified into a stereoscopic type using glasses such as shutter glasses, polarized glasses, or the like and an autostereoscopic type in which a lenticular lens and a parallax barrier, or the like are disposed in a display device without using glasses.

According to the polarized glass type, a polarization switching panel, a patterned retarder, or the like are separately attached to a general LCD panel.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a three dimensional image display device.

Additional features of the invention will be set forth in the description which follows, and in part will be apparent from the description, or may be learned by practice of the invention.

An exemplary embodiment of the present invention provides a three dimensional is image display device, including: a liquid crystal display panel assembly to spatially divide an image display area and alternately display a left eye image and a right eye image on the image display area; and a patterned retarder to polarize the left eye image and the right eye image in different directions. The liquid crystal display panel assembly comprises a first pixel and a second pixel disposed adjacent to each other in a vertical direction, the first pixel comprises a first subpixel and a second subpixel disposed adjacent to each other in the vertical direction, and the second pixel comprises a third subpixel and a fourth subpixel which are disposed adjacent to each other in the vertical direction. The first subpixel and the third subpixel, or the second subpixel and the fourth subpixel display black in a three dimensional (3D) display mode and display a normal image in a two dimensional (2D) display mode. Furthermore, polarities of data voltages applied to the first subpixel and the second subpixel are opposite to polarities of data voltages applied to the third subpixel and the fourth subpixel, respectively.

Another exemplary embodiment of the present invention provides a three dimensional image display device, including: a display panel to display a left eye image and a right eye image; and a patterned retarder to polarize the left eye image and the right eye image in different directions. The display panel comprises a first pixel and a second pixel disposed adjacent to each other in a first direction, the first pixel comprises a first subpixel and a second subpixel disposed adjacent to each other in the first direction, and the second pixel comprises a third subpixel and a fourth subpixel disposed adjacent to each other in the first direction. The first subpixel and the third subpixel, or the second subpixel and the fourth subpixel are configured to display a reference gray scale in a three dimensional (3D) display mode and to display a normal image gray scale in a two dimensional (2D) display mode. Furthermore, the first subpixel and the second subpixel are configured to receive data voltages having an opposite polarity of data voltages applied to the third subpixel and the fourth subpixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
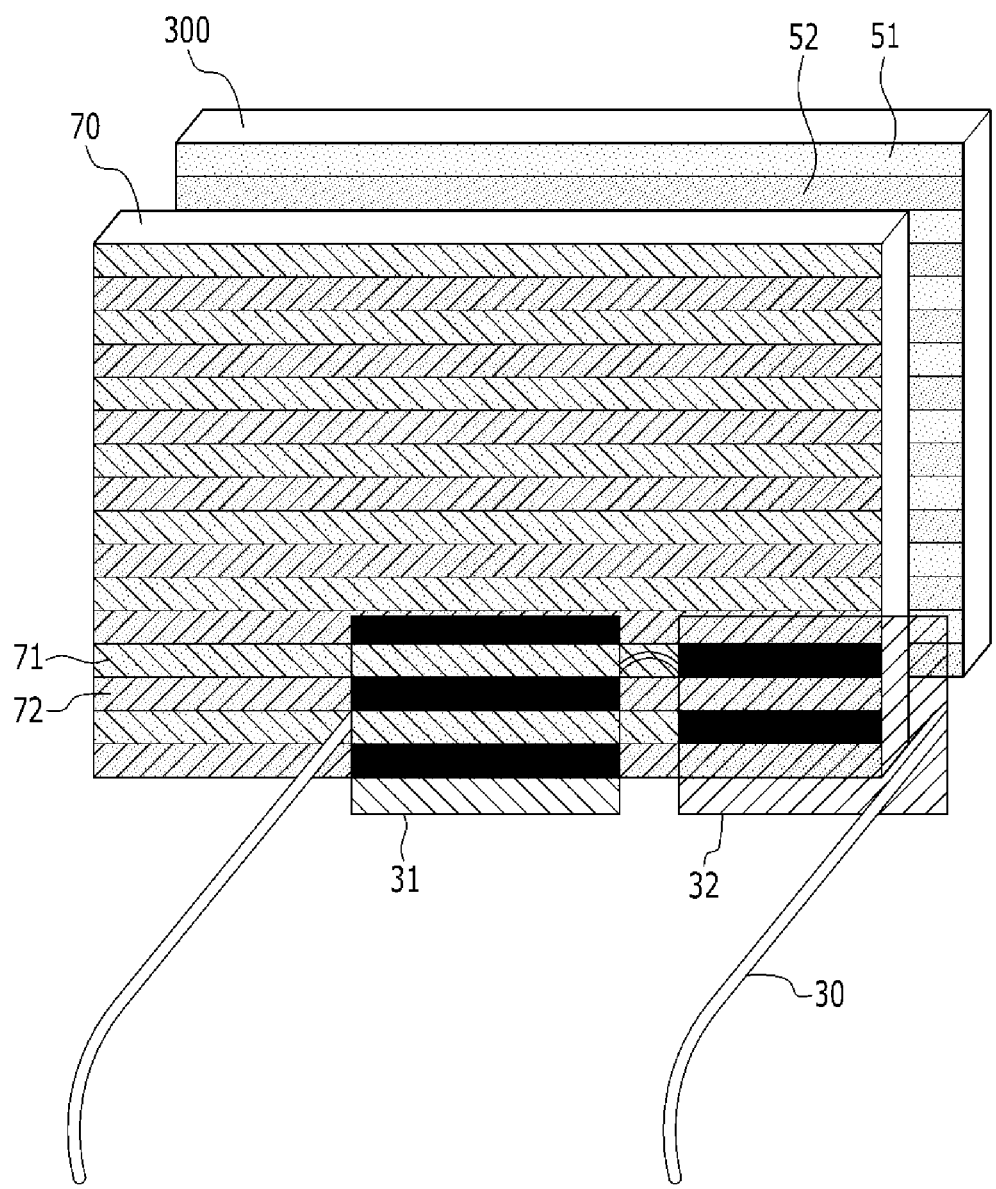
FIG. 1 is a view schematically illustrating a manner of displaying an image by a three dimensional image display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. Further, the detailed description of the related art that has been widely known is omitted.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. When an element is referred to as being "directly on" another element, there are no intervening elements present. In contrast, it will be understood that when an element such as a layer, film, region, or substrate is referred to as being "beneath" another element, it can be directly beneath the other element or intervening elements may also be present. When an element is referred to as being "directly beneath" another element, there are no intervening elements present.

Hereinafter, a three dimensional image display device according to an exemplary embodiment of the present invention will be described in detail with reference to FIG. 1 to FIG. 5.

FIG. 1 is a view schematically illustrating a manner of displaying an image by a three dimensional image display device according to an exemplary embodiment of the present invention.

Referring to FIG. 1, the three dimensional image display device may include a liquid crystal display panel assembly 300 and a patterned retarder 70 attached to the liquid crystal display panel assembly 300. The patterned retarder 70 may polarize a left eye image and a right eye image displayed on the liquid crystal display panel assembly 300 in different directions by spatially dividing an image display area. For example, the left eye image and the right eye image are spatially divided in a horizontal direction, respectively, and a plurality of divided left eye image portions 51 and a plurality of divided right eye image portions 52 may be alternately displayed on the liquid crystal display panel assembly 300. The patterned retarder 70 may include a plurality of left eye image polarizing portions 71 and a plurality of right eye image polarizing portions 72 which are patterned in different directions at positions corresponding to regions where the plurality of left eye image portions 51 and the plurality of right eye image portions 52 are displayed. The plurality of left eye image polarizing portions 71 may polarize the plurality of left eye image portions 51 in a first direction and the plurality of right eye image polarizing portions 72 may polarize the plurality of right eye image portions 52 in a second direction. Here, the first direction and the second direction are different from each other. Through a left eye glass 31 of polarized glasses 30, only the plurality of left eye image portions 51 may appear in sight and the plurality of right eye image portions 52 may appear black. Through a right eye glass 32 of the polarized glasses 30, only the plurality of right eye image portions 52 may appear in sight and the plurality of left eye image portions 51 may appear black. Accordingly, the left eye image and the right eye image are fused in the brain and recognized as a 3D image having depth perception.

Figure 2:
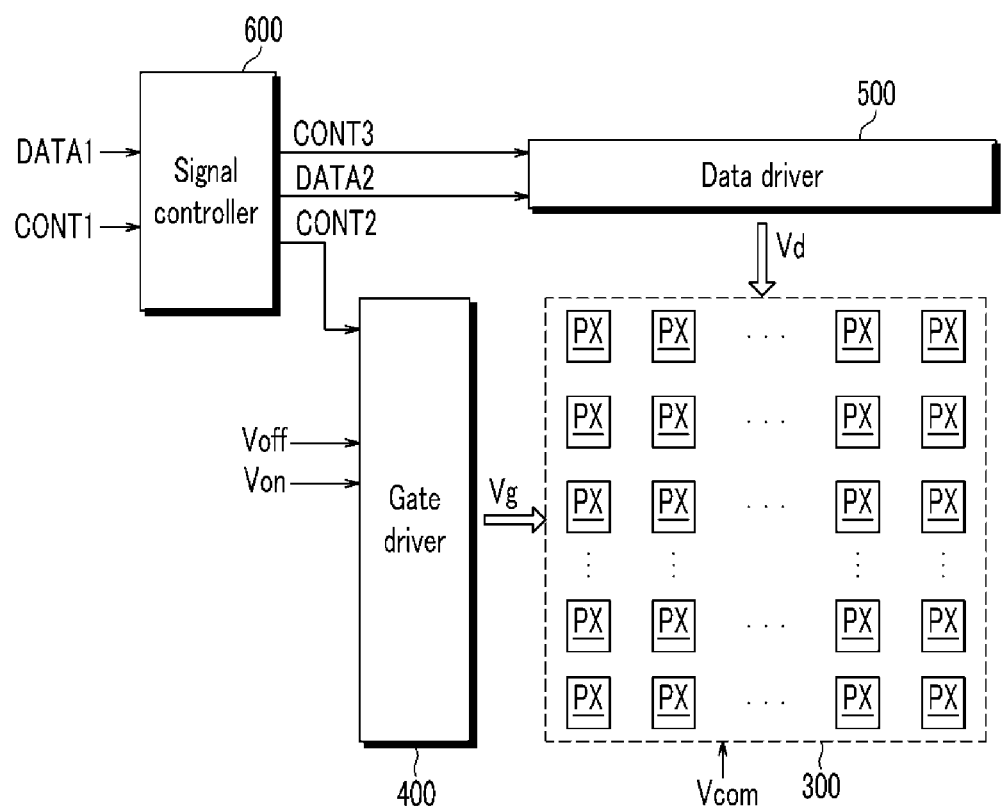
FIG. 2 is a view schematically illustrating a three dimensional image display device according to an exemplary embodiment of the present invention.

FIG. 2 is a view schematically illustrating a three dimensional image display device according to an exemplary embodiment of the present invention.

Referring to FIG. 2, the three dimensional image display device may include a liquid crystal display panel assembly 300, a gate driver 400, a data driver 500 and a signal controller 600.

The liquid crystal display panel assembly 300 includes a plurality of signal lines (not shown) and a plurality of pixels PX connected thereto. The liquid crystal display panel assembly 300 may include a light source. The liquid crystal display panel assembly 300 may include two display panels (not shown) on which a pair of field generating electrodes are formed and a liquid crystal layer (not shown) interposed therebetween.

The signal lines may include a plurality of gate lines transferring gate signals ("scanning signals") and a plurality of data lines to transfer data voltages. The plurality of gate lines may extend in a substantially row direction and may be substantially parallel to each other. The plurality of data lines may extend in a substantially column direction and may be substantially parallel to each other.

Each of the pixels PX may uniquely display one of the primary colors (spatial division) or the plurality of pixels PX may alternately display the primary colors over time (temporal division), such that a desired color may be displayed by a spatial or temporal sum of the primary colors. Examples of the primary colors include three primary colors of red, green and blue.

The gate driver 400 is connected to the gate lines of the liquid crystal display panel assembly 300 to apply gate signals, which are configured by the combination of a gate-on voltage Von and a gate-off voltage Voff from the outside, to the gate lines.

The data driver 500 is connected to the data lines of the liquid crystal display panel assembly 300 to apply data voltages to the data lines.

The signal controller 600 controls operations of the gate driver 400 and the data driver 500.

At least one of the gate driver 400, the data driver 500, and the signal controller 600 may be mounted on a display device in a form of an integrated circuit (IC) chip or may be integrated on a display panel together with other elements.

The signal controller 600 receives input image signals DATA1 and input control signals CONT1 to control a display thereof from an external graphic controller (not shown). Examples of the input control signals CONT1 include a vertical synchronization signal, a horizontal synchronizing signal, a main clock, a data enable signal, and the like. The signal controller 600 properly processes the input image signals DATA1 to be suitable for an operating condition of the liquid crystal display panel assembly 300 based on the input image signals DATA1 and the input control signals CONT1, and generates gate control signals CONT2 and data control signals CONT3, and the like. Thereafter, the signal controller 600 transmits the gate control signals CONT2 to the gate driver 400 and transmits the data control signals CONT3 and the processed image signals DATA2 to the data driver 500.

The gate control signals CONT2 may include a scanning start signal to notify a is start of a frame, a gate clock signal to control an output period of the gate-on voltage Von, an output enable signal to limit a duration time of the gate-on voltage Von, and the like.

The data control signals CONT3 may include a horizontal synchronization start signal to notify a transmission start of the processed image signals DATA2, a load signal to instruct the application of data voltages to the data lines, an inversion signal RVS to invert a polarity of the data voltages with respect to the common voltage Vcom ("polarity of the data voltage" instead of "polarity of the data voltages with respect to the common voltage"), a data clock signal, and the like.

The data driver 500 converts the image signals DATA2 processed according to the data control signals CONT3 from the signal controller 600 into data voltages, and then applies the data voltages to the data lines.

The gate driver 400 applies the gate-on voltage Von to a selected gate line according to the gate control signals CONT2 from the signal controller 600 to turn on a respective switching element connected to the selected gate line, and accordingly, the data voltages applied to the data lines are applied to corresponding pixels through the turned-on switching elements.

A difference between a data voltage applied to a pixel and the common voltage Vcom is represented as a pixel voltage.

Figure 3A:
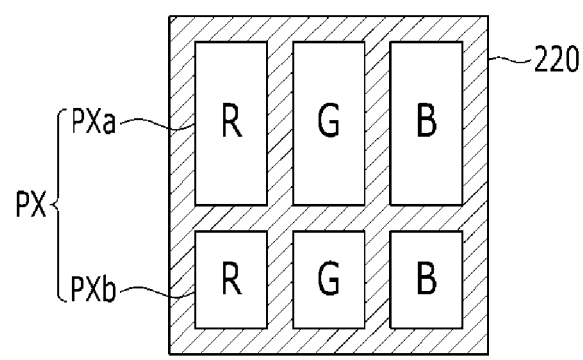
FIG. 3A is a view schematically illustrating a 2D display mode of a three dimensional image display device according to an exemplary embodiment of the present invention.
Figure 3B:
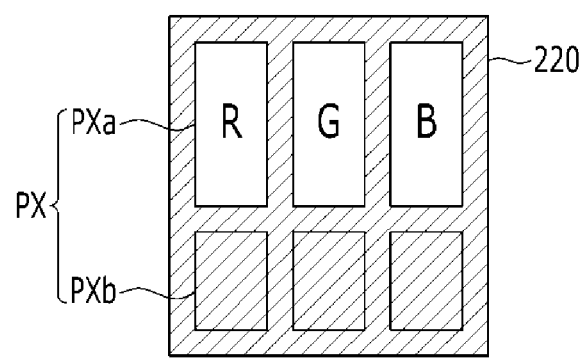
FIG. 3B is a view schematically illustrating a 3D display mode of a three dimensional image display device according to an exemplary embodiment of the present invention.

FIG. 3A is a view schematically illustrating a 2D display mode of a three dimensional image display device according to an exemplary embodiment of the present invention, and FIG. 3B is a view schematically illustrating a 3D display mode of a three dimensional image display device according to an exemplary embodiment of the present invention.

Referring to FIG. 3A and FIG. 3B, a plurality of pixels are surrounded by a light blocking member 220, and a single pixel PX may include two subpixels PXa and PXb that are vertically disposed to improve side visibility. For example, any one of the two subpixels PXa and PXb may be a low subpixel to display a low gray, the other subpixel may be a high subpixel to display a high gray, and data voltage obtained from the same image information may be applied to the two subpixels PXa and Pxb. Any one of the two subpixels PXa and PXb may display a normal image in a 2D display mode and black in a 3D display mode. Accordingly, in the 2D display mode, a black display area may be reduced to enhance an aperture ratio and transmittance, and in the 3D display mode, a vertical length of the black display area may increase to improve a vertical viewing angle. For example, in the 2D display mode, both the two subpixels PXa and PXb display red R, green G, or blue B, and in the 3D display mode, a subpixel PXa displays red R, green G, or blue B and the other subpixel PXb displays black. Here, the 3D display mode refers to a case where a three dimensional image including a left eye image and a right eye image is input, and the 2D display mode refers to a case where a normal 2D image not the three dimensional image is input.

Figure 4A:
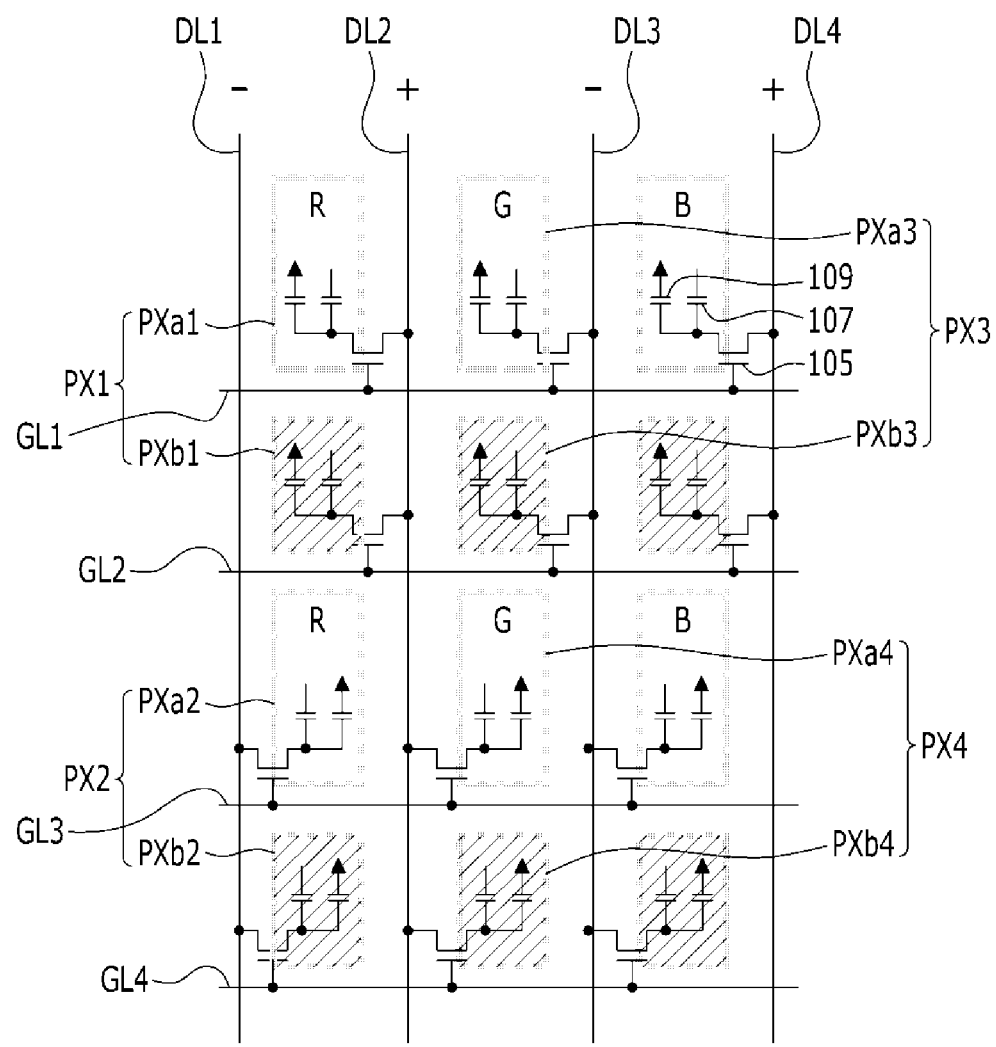
FIG. 4A is a pixel layout view of a three dimensional image display device according to an exemplary embodiment of the present invention.
Figure 4B:
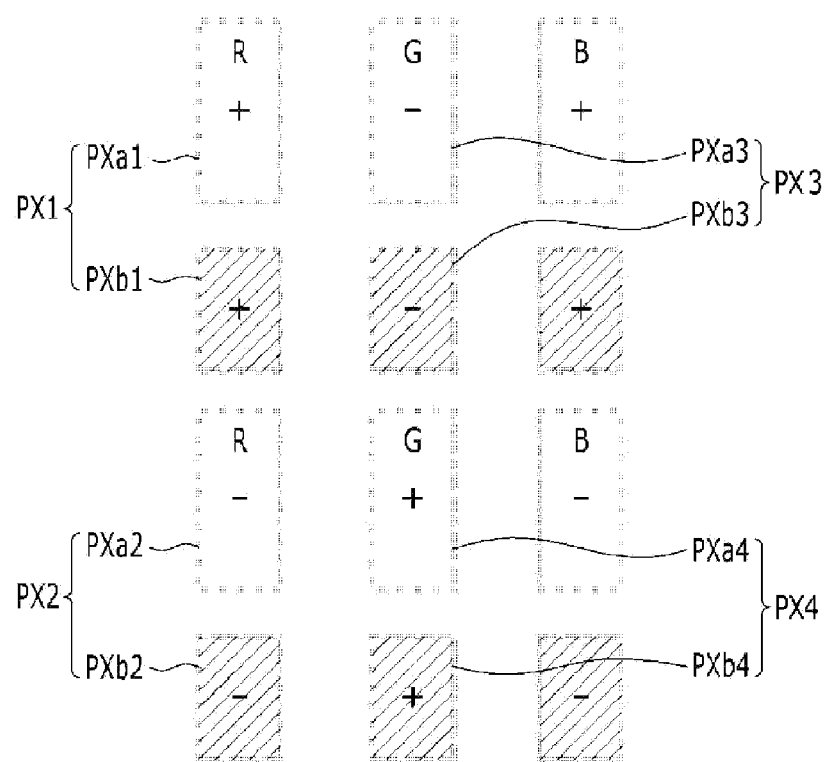
FIG. 4B is a view illustrating polarities of pixels of the three dimensional image display device of FIG. 4A.
Figure 5A:
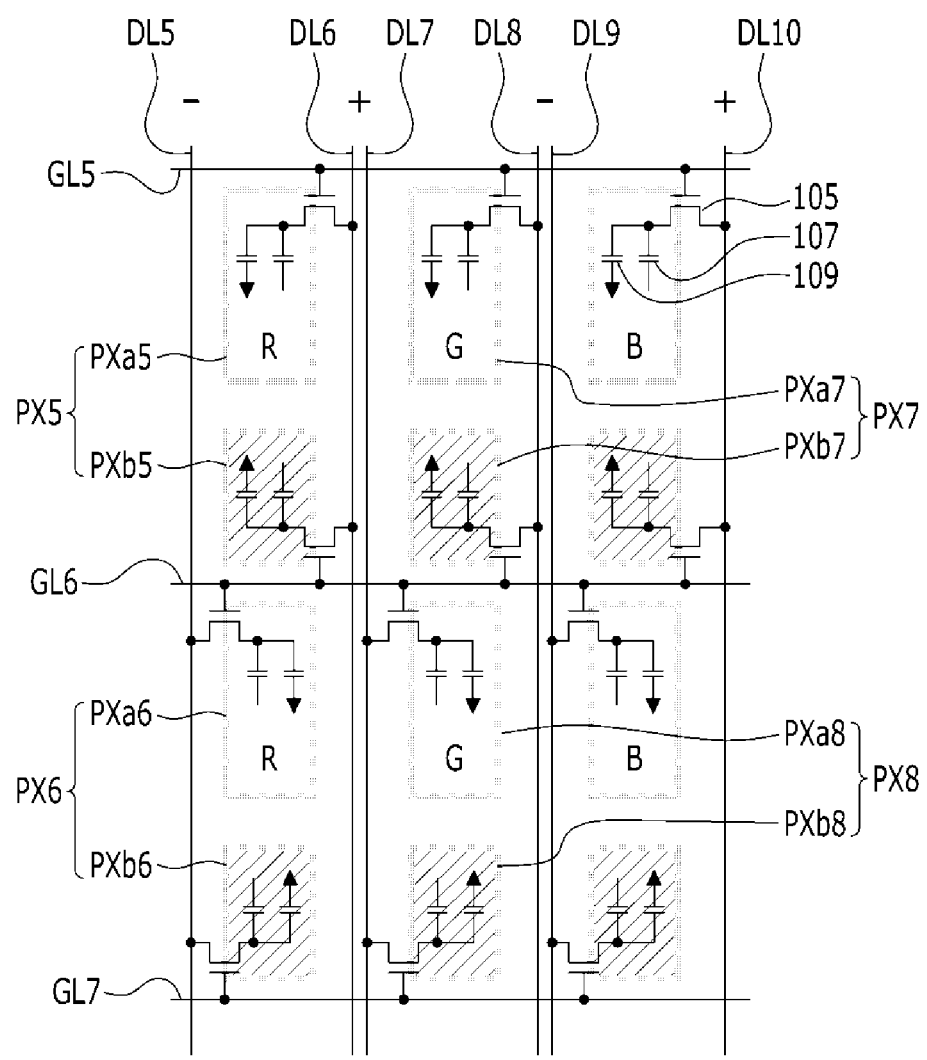
FIG. 5A is a pixel layout view of a three dimensional image display device according to an exemplary embodiment of the present invention.
Figure 5B:
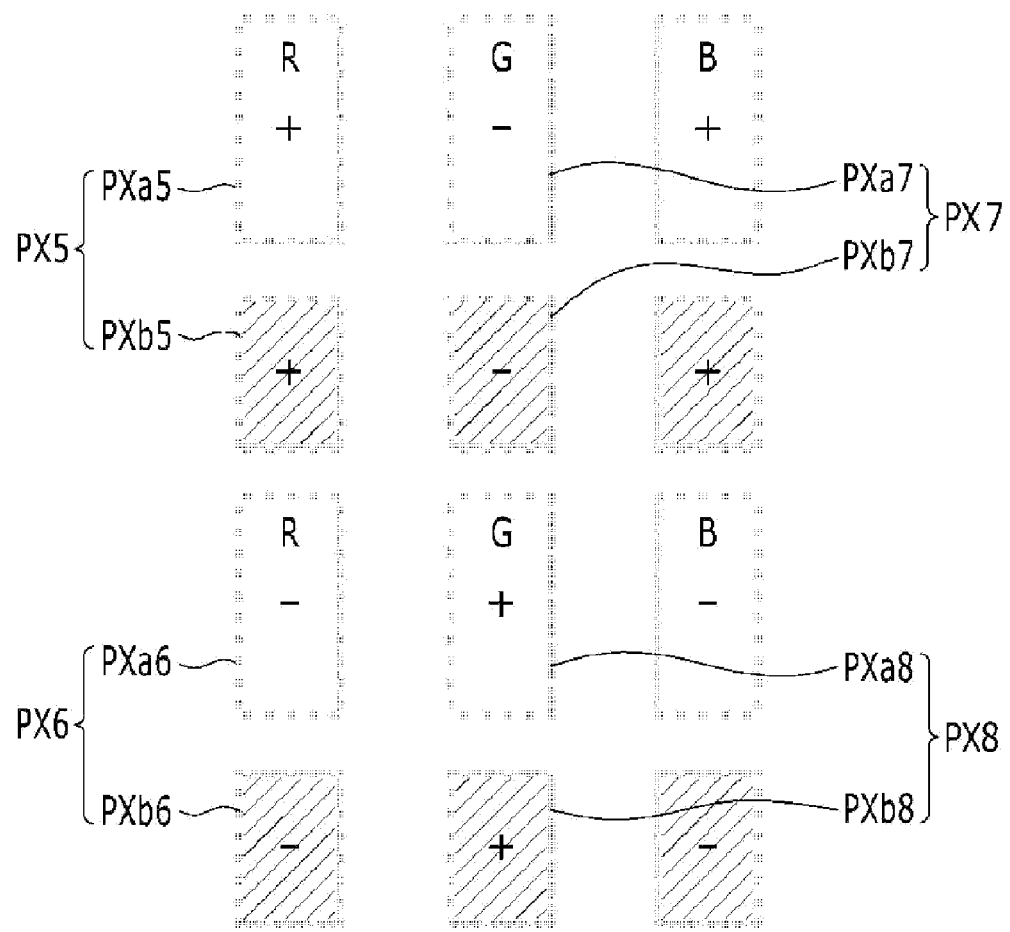
FIG. 5B is a view illustrating polarities of pixels of the three dimensional image display device of FIG. 5A.

FIG. 4A is a pixel layout view of a three dimensional image display device according to an exemplary embodiment of the present invention, FIG. 4B is a view illustrating polarities of pixels of the three dimensional image display device of FIG. 4A, FIG. 5A is a pixel layout view of a three dimensional image display device according to an exemplary embodiment of the present invention, and FIG. 5B is a view illustrating polarities of pixels of the three dimensional image display device of FIG. 5A.

Referring to FIG. 4B and FIG. 5B, data voltages having the same polarity are applied to the two subpixels PXa and PXb which are vertically disposed, and data voltages is having different polarities are applied to two adjacent pixels PX1 and PX2, PX3 and PX4, PX5 and PX6, and PX7 and PX8, respectively, which are vertically disposed. Further, data voltages having different polarities are applied to the two adjacent pixels PX1 and PX3, PX2 and PX4, PX5 and PX7, and PX6 and PX8, respectively, which are horizontally disposed. For example, PXa1 and PXb1 may be applied with positive data voltages, PXa2 and PXb2 may be applied with negative data voltages, PXa3 and PXb3 may be applied with negative data voltages, PXa4 and PXb4 may be applied with positive data voltages, PXa5 and PXb5 may be applied with positive data voltages, PXa6 and PXb6 may be applied with negative data voltages, PXa7 and PXb7 may be applied with negative data voltages, and PXa8 and PXb8 may be applied with positive data voltages. On the contrary, PXa1 and PXb1 may be applied with negative data voltages, PXa2 and PXb2 may be applied with positive data voltages, PXa3 and PXb3 may be applied with positive data voltages, PXa4 and PXb4 may be applied with negative data voltages, PXa5 and PXb5 may be applied with negative data voltages, PXa6 and PXb6 may be applied with negative data voltages, PXa7 and PXb7 may be applied with positive data voltages, and PXa8 and PXb8 may be applied with negative data voltages.

Accordingly, data voltage having different polarities may be applied to the subpixels PXa1 and PXa2, PXa3 and PXa4, PXa5 and PXa6, and PXa7 and PXa8 adjacent to each other in a vertical direction, in which a normal image is displayed in the 3D display mode to reduce a defect of a screen such as a vertical line phenomenon, an afterimage, or a crosstalk phenomenon. The subpixels PXb1, PXb2, PXb3, PXb4, PXb5, PXb6, PXb7, and PXb8, in which the normal image is not displayed in the 3D display mode, display black. While the subpixels PXb1, PXb2, PXb3, PXb4, PXb5, PXb6, PXb7, and PXb8 have been described to display black when the normal image is not display in the 3D display mode, other color than is black may be used in certain embodiments. For example, the subpixels PXb1, PXb2, PXb3, PXb4, PXb5, PXb6, PXb7, and PXb8 may display dark gray color instead of black.

On the other hand, if data voltage having the same polarity is applied to the subpixels PXa1 and PXa2, PXa3 and PXa4, PXa5 and PXa6, and PXa7 and PXa8 adjacent to each other in the vertical direction, in which the normal image is displayed in the 3D display mode, the potential of the common voltage Vcom may be distorted and the defect of a screen such as a vertical line phenomenon, an afterimage, or a crosstalk phenomenon may increase.

Referring to FIG. 4A and FIG. 5A, column inversion may be applied to data lines DL1-DL10, and accordingly, power consumption may be reduced compared to the case where dot inversion is applied.

Referring to FIG. 4A, in a 2G1D structure, a unit consisting of two gate lines GL1/GL2 and GL3/GL4 or a unit consisting of two subpixels PXa1/PXb1, PXa2/PXb2, PXa3/PXb3, and PXa4/PXb4 vertically disposed adjacent to each other is alternately connected to a single data line in a horizontal direction such as a left or right direction. For example, two subpixels PXa1 and PXb1 are connected to a single data line DL2 at the left and other two subpixels PXa4 and PXb4 are connected to the single data line DL2 at the right. The data voltage applied through the data lines DL1-DL4 may be charged in a liquid crystal capacitance capacitor 107 or a storage capacitance capacitor 109 through a thin film transistor 105. When negative, positive, negative, and positive data voltages are applied to the plurality of data lines DL1-DL4, respectively, polarities applied to pixels may be illustrated as in FIG. 4B. Further, when positive, negative, positive, and negative data voltages are applied to the plurality of data lines DL1-DL4, respectively, polarities opposite to the polarities illustrated in FIG. 4B may be displayed on the pixels.

Referring to FIG. 5A, in a 1G2D structure, a unit consisting of two subpixels PXa5/PXb5, PXa6/PXb6, PXa7/PXb7, and PXa8/PXb8 vertically disposed adjacent to each other is alternately connected to data lines DL5, DL7, and DL9 disposed at the left of the pixels and data lines DL6, DL8, and DL10 disposed at the right of the pixels. For example, two subpixels PXb7 and PXa8 are connected to a gate line GL6 in a vertical direction and the two subpixels PXb7 and PXa8 are connected to two data lines DL7 and DL8 disposed at the left and right sides of the two subpixels PXb7 and PXa8, respectively. When negative, positive, positive, negative, negative, and positive data voltages are applied to a plurality of data lines DL5-DL10, respectively, polarities applied to pixels may be displayed as shown FIG. 5B. Further, when positive, negative, negative, positive, positive, and negative data voltages are applied to the plurality of data lines DL5-DL10, respectively, polarities opposite to the polarities shown in FIG. 5B may be displayed on the pixels.

According to the exemplary embodiment of the present invention, power consumption may be reduced, a defect of a screen such as a vertical line phenomenon, an afterimage, or a crosstalk phenomenon may be reduced, an aperture ratio and transmittance may increase, and a vertical viewing angle may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A three dimensional image display device, comprising:
   a liquid crystal display panel assembly configured to spatially divide an image display area and alternately display a left eye image and a right eye image on the image display area; and
   a patterned retarder configured to polarize the left eye image and the right eye image in different directions,
   wherein:
   the liquid crystal display panel assembly comprises:
      a first pixel and a second pixel disposed adjacent to each other in a vertical direction, the first pixel comprising a first subpixel and a second subpixel disposed adjacent to each other in the vertical direction, and the second pixel comprising a third subpixel and a fourth subpixel which are disposed adjacent to each other in the vertical direction;
      a first data line and a second data line disposed at the right of the first data line, the first pixel and the second pixel are disposed between the first data line and the second data line, the first subpixel and the second subpixel are connected to the second data line, and the third subpixel and the fourth subpixel are connected to the first data line; and
      a gate line disposed between the second subpixel and the third subpixel and connected to the second subpixel and the third subpixel;
   one of the subpixels in each of the first and second pixels is configured to display a high gray, the other one of the subpixels in each of the first and second pixels is configured to display a low gray, and both of the subpixels in each of the first and second pixels are applied with data voltages obtained from the same information in a two dimensional (2D) display mode;
   in a three dimensional (3D) display mode, both the first subpixel and the third subpixel are configured to display black, or both the second subpixel and the fourth subpixel are configured to display black; and
   polarities of data voltages applied to the first subpixel and the second subpixel are opposite to polarities of data voltages applied to the third subpixel and the fourth subpixel, respectively.

2. The three dimensional image display device of claim 1, wherein:
   the data voltages are input to the first data line and the second data line by column inversion.

3. The three dimensional image display device of claim 2, wherein:
   the polarities of data voltages applied to the first data line and the second data line are opposite to each other.

4. The three dimensional image display device of claim 1, wherein:
   no gate line is disposed between the first subpixel and the second subpixel and no gate line is disposed between the third subpixel and the fourth subpixel.

5. The three dimensional image display device of claim 1, wherein:
   the data voltages are input to the first data line and the second data line by column inversion.

6. The three dimensional image display device of claim 5, wherein:
   the polarities of the data voltages applied to the first data line and the second data line are opposite to each other.

7. The three dimensional image display device of claim 1, wherein:
   the liquid crystal display panel assembly comprises a third pixel disposed adjacent in a horizontal direction of the first pixel and a fourth pixel disposed adjacent in the horizontal direction of the second pixel, the third pixel comprises a fifth subpixel and a sixth subpixel disposed adjacent to each other in the vertical direction, and the fourth pixel comprises a seventh subpixel and an eighth subpixel disposed adjacent to each other in the vertical direction, and
   a polarity of the data voltages applied to the first subpixel and the second subpixel is opposite to a polarity of the data voltages applied to the fifth subpixel and the sixth subpixel and a polarity of the data voltages applied to the third subpixel and the fourth subpixel is opposite to a polarity of data voltages applied to the seventh subpixel and the eighth subpixel.

8. The three dimensional image display device of claim 7, wherein:
   the first subpixel, the second subpixel, the third subpixel, and the fourth subpixel are disposed in a first column in sequence, the fifth subpixel, the sixth subpixel, the seventh subpixel, and the eighth subpixel are disposed in a second column in sequence, and the second column is disposed adjacent at the right of the first column.

9. The three dimensional image display device of claim 1, wherein:
   the left eye image and the right eye image comprise a plurality of left eye image portions and a plurality of right eye image portions divided in a horizontal direction, respectively, and
   the patterned retarder comprises a plurality of left eye image polarizing portions and a plurality of right eye image polarizing portions polarizing the plurality of left eye image portions and the plurality of right eye image portions in different directions, respectively.

10. The three dimensional image display device of claim 9, wherein:
    the plurality of left eye image polarizing portions are patterned in a first direction at positions corresponding to regions where the plurality of left eye image portions are displayed, and the plurality of right eye image polarizing portions are patterned in a second direction at positions corresponding to regions where the plurality of right eye image portions are displayed.

11. A three dimensional image display device, comprising:
a display panel configured to display a left eye image and a right eye image; and
a patterned retarder configured to polarize the left eye image and the right eye image in different directions,
wherein:
the display panel comprises:
- a first pixel and a second pixel disposed adjacent to each other in a first direction, the first pixel comprising a first subpixel and a second subpixel disposed adjacent to each other in the first direction, and the second pixel comprising a third subpixel and a fourth subpixel disposed adjacent to each other in the first direction;
- a first data line and a second data line disposed at the right of the first data line, the first pixel and the second pixel are disposed between the first data line and the second data line, the first subpixel and the second subpixel are connected to the second data line, and the third subpixel and the fourth subpixel are connected to the first data line; and
- a gate line disposed between the second subpixel and the third subpixel and connected to the second subpixel and the third subpixel;

one of the subpixels in each of the first and second pixels is configured to display a high gray, the other one of the subpixels in each of the first and second pixels is configured to display a low gray, and both of the subpixels in each of the first and second pixels are applied with data voltages obtained from the same information in a two dimensional (2D) display mode;

in a three dimensional (3D) display mode, both the first subpixel and the third subpixel are configured to display a reference gray scale, or both the second subpixel and the fourth subpixel are configured to display a reference gray scale; and the first subpixel and the second subpixel are configured to receive data voltages having an opposite polarity of data voltages applied to the third subpixel and the fourth subpixel.

* * * * *